Feb. 20, 1951 S. I. RAMBO ET AL 2,542,837

FREQUENCY STABILIZATION SYSTEM

Filed May 28, 1947 2 Sheets-Sheet 1

INVENTORS
Sheldon I. Rambo and
Rupert L. Rumpf, Jr.
BY
Hyman Diamond
ATTORNEY

FREQUENCY STABILIZATION SYSTEM

Filed May 28, 1947 2 Sheets-Sheet 2

WITNESSES:
E. A. McCloskey.
Wm. C. Groome

INVENTORS
Sheldon I. Rambo and
Rupert L. Rumpf, Jr.
BY
Hymen Diamond.
ATTORNEY

Patented Feb. 20, 1951

2,542,837

UNITED STATES PATENT OFFICE 2,542,837

FREQUENCY STABILIZATION SYSTEM

Sheldon I. Rambo, Baltimore, and Rupert L. Rumpf, Jr., Catonsville, Md., assignors to Westinghouse Electric Corporation, East Pittsburgh, Pa., a corporation of Pennsylvania Application May 28, 1947, Serial No. 750,970

13 Claims. (Cl. 250—36)

Our invention relates to electric discharge apparatus and it has particular relation to high frequency heating apparatus.

In the high frequency heating art, a charge is heated either by electromagnetic induction or dielectrically. The power for heating is supplied from an electronic oscillator of the high frequency type. The frequency of the oscillations is determined in part by the reactances associated with the oscillator, and in part by the reactance of the charge. In an electromagnetic heating system the charge reactance is inductive; in a dielectric heating system the charge reactance is capacitive. As the charge is heated and its temperature rises, its electrical properties change. The dielectric constant of a dielectric charge changes materially as its temperature increases. Similarly, the magnetic properties of a ferrous charge changes over an extensive range as it passes through the Curie point. The changes in the properties of the charge result in changes in the reactances which determine the frequency of the oscillator and produce changes in the oscillator frequency. The oscillator frequency may also vary for other reasons such as wide fluctuations in ambient temperature or in the power supply.

For numerous reasons excessive variation in the frequency of the heating oscillator is undesirable. The Federal Communications Commission has allotted certain frequency bands for high frequency heating. The allotment is subject to the condition that the frequency of any heating system operating in the allotted band shall not drift from the band. Frequency variation arising from changes in the charge or from other causes may result in violation of this condition. In certain situations, the electric discharge devices included in the oscillator are designed to operate efficiently within a limited frequency band. Frequency drift out of the band results in a material decrease in efficiency. The peculiarities of the charge or the pecularities of the heating process also may require that the frequency of the oscillator be maintained within a frequency band. In such cases excessive drift of the frequency may not produce the result desired. The charge may be charred or insufficiently heated.

High frequency heating equipment constructed in accordance with the teachings of the prior art, of which we are aware, includes a variable lumped reactance in the frequency determining network of the heating oscillator. The reactance is varied automatically in response to changes in the frequency of the oscillator in such a sense as to compensate for the variations. The power output of the heating oscillator is high and the potential differences impressed in the oscillator circuit are correspondingly high. Therefore, the dimensions of the variable reactance are large and its electrical inertia is high. As the reactance is varied in response to variations in the frequency of oscillation, it tends, by reason of its high electrical inertia, to overcompensate. A variation in frequency in a sense opposite to the original sense, which is nearly as large as the original variation, is produced. The reactance is then again varied and again overcompensates and the above described compensating operation is repeated. This hunting process, once initiated by a variation in frequency, continues for an extended time interval and during the interval the operation of the oscillator is improper.

It is, accordingly, an object of our invention to provide a high frequency heating system, the frequency of which shall be maintained precisely within a preset frequency band.

Another object of our invention is to provide a high power, high frequency oscillator for induction or dielectric heating purposes which shall include facilities for compensating for frequency variations and in the operation of which any tendency to hunt shall be suppressed.

A further object of our invention is to provide a high power, high frequency oscillator including a frequency responsive tuning reactance of substantial electrical inertia, variation of which in response to changes in frequency shall not cause substantial overcompensation.

A general object of our invention is to provide a frequency compensated, stable source of high power, high frequency oscillations.

An ancillary object of our invention is to provide a variable reactance of simple and inexpensive structure for use in a high power, high frequency stabilized oscillator.

Another ancillary object of our invention is to provide a resonant network capable of operating in a high power, high frequency circuit and having high frequency stability.

In accordance with our invention, we provide a high frequency oscillator including in its frequency determining network a tuning reactance composed of a plurality of separately actuable components. Actuation of one of the components produces a relatively small change in the resonant frequency of the network. Actuation of several of the components produces a substantially larger change in frequency. In operating the reactance, one of the components is initially varied, producing a progressively increasing variation in the frequency. After the first component has been actuated over a predetermined range, other components are actuated with it. The progressive variation in frequency is thus materially increased.

If the frequency of an oscillator including a tuning reactance of this type deviates from the preset limits, complete or partial compensation may be effected by movement of one of the components of the reactance. As this one component has a relatively small electrical inertia, its actuation will not tend to cause overcompensation. The several movable components of the reactance have a substantial combined electrical inertia. If the frequency deviation is so large as to require actuation of other movable components of the reactance after the first has been actuated, overcompensation may occur. The motion of the larger electrical inertia is started only after the smaller electrical inertia has to a large extent compensated for the original error. Therefore, the deviation resulting from the overcompensation is substantially smaller than the initial deviation. The overcompensation may then be corrected by actuation in a sense opposite to that of the original actuation of the one component which was actuated in response to the original error.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
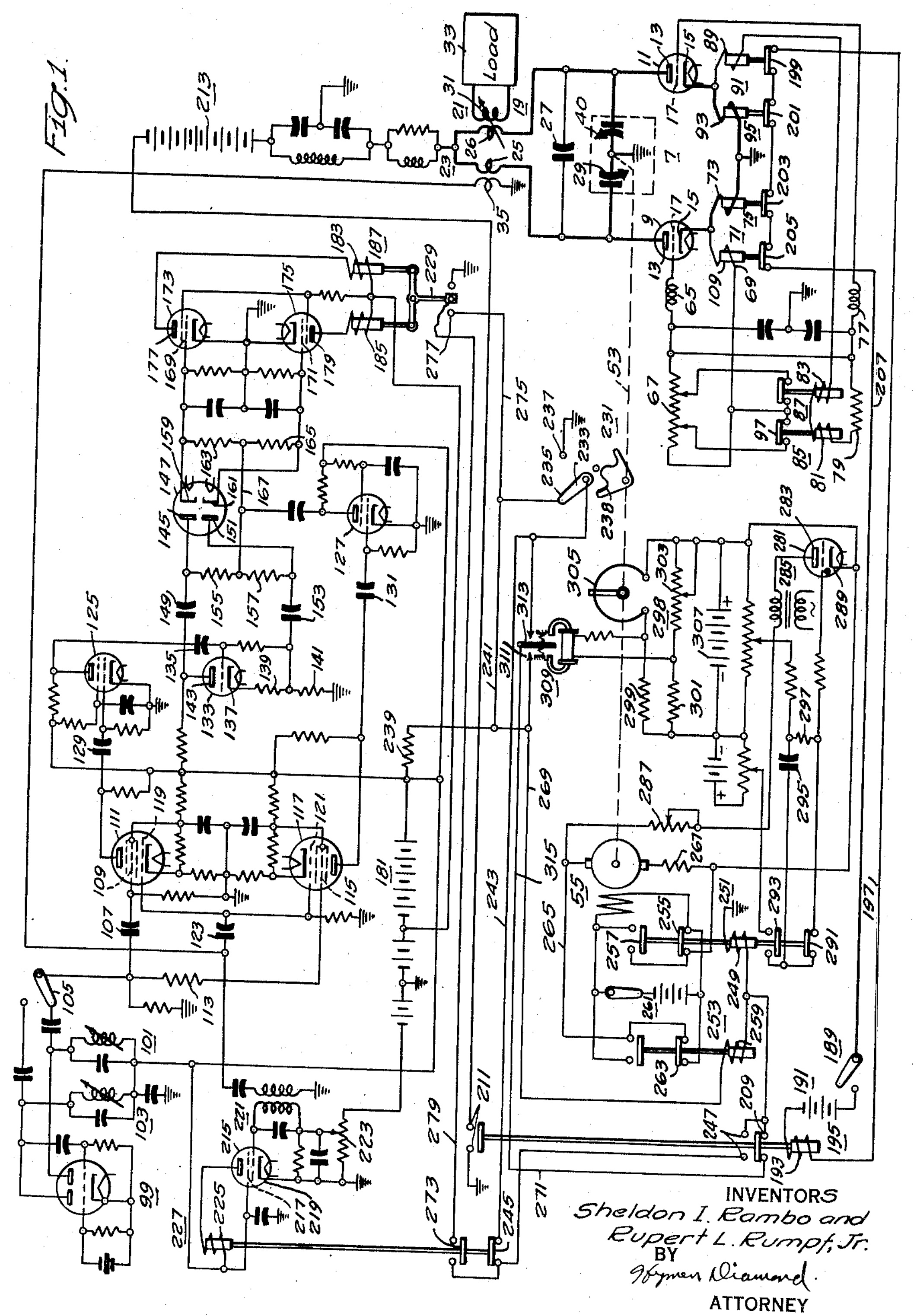
Figure 1 is a circuit diagram of an embodiment of our invention.

The apparatus shown in Fig. 1 comprises a high power, high frequency oscillation generator 7 including two electric discharge devices 9 and 11, each having an anode 13, a cathode 15 and a control electrode 17. Ordinarily it is desirable that the frequency of the oscillator 7 be of the order of 10 or 20 megacycles. Under such circumstances the discharge devices 9 and 11 are of the high vacuum type. However in situations where the frequency of the oscillator is to be substantially lower, electric discharge devices of the gaseous type may be utilized.

Between the anodes of the discharge devices, a resonant network 19 is connected. The network includes the two transformers 21 and 23, the primaries 25 and 26 of which are connected in series, a fixed capacitor 27, connected between the outer terminals of the primaries 25, and a pair of simultaneously variable serially connected capacitors 29 and 40 which are connected between the same terminals.

The transformers 21 and 23 are not transformers of the ordinary type. The primaries 25 and 26 are single loops which constitute the inductive reactance of the resonant network 19. The secondary 31 is a two-turn loop adjustably coupled to the primary 26, and the secondary 35 in a single-turn loop loosely coupled to the primary 25. The secondary 31 may be, and frequently is, coupled to both loops 25 and 26.

The secondary 31 of the transformer 21 is connected to supply the load 33 or, in the case of a high frequency heating system, the charge or the heating-coil. If the charge 33 is of the dielectric type, the secondary 31 is connected between condenser plates (not shown) between which the charge is interposed. If the heating is of the inductive type, the charge 33 is disposed so as to be magnetically coupled to the secondary. The secondary 35 of the other transformer 23 is coupled to a frequency compensation system. The load transformer 21 is designed to carry substantial power; the compensation transformer 23 is of the low power type.

Figure 3:
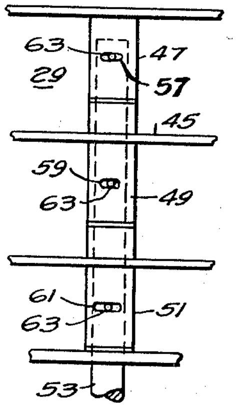
Fig. 3 is a view in end elevation showing a portion of the tuning reactance used in the practice of our invention.
Figure 2:
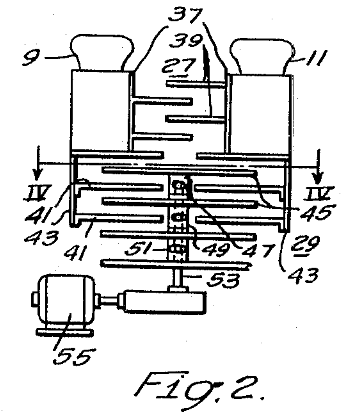
Fig. 2 is a view in end elevation showing a portion of the oscillator used in the practice of our invention.
Figure 4:
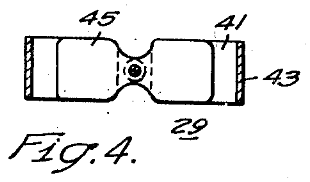
Fig. 4 is a view in section taken along line IV—IV of Fig. 2.

The structure of the capacitors 27 and 29 and their connection to the discharge devices 9 and 11 are shown in Figs. 2 to 4. Each discharge device is of the type having a hollow cylindrical metallic jacket 37 through which a cooling fluid such as water is conducted. The inner wall of the jacket 37 constitutes the anode 13 of each device. The fixed capacitor 27 has fixed horizontal plates 39 which are conductively secured to the outer cylindrical walls of the jackets 37; the plates secured to one of the jackets overlapping the other plates. The variable capacitors 29 and 40 have sets of spaced horizontal fixed plates 41 which are of rectangular shape and are assembled on two vertical rectangular plates 43. The two vertical rectangular plates 43 are suspended from the bases of the jackets 37, and each vertical plate 43 conductively carries a set of spaced horizontal fixed plates 41. Alternatively, the fixed plate assembly could have been constructed integral with the fixed capacitor, in which case, the plates 39 and 41 would have been mounted on a bracket which is secured to the jackets 37. In the assembly shown, the vertical supporting-plates 43 are secured by welding or brazing to the jackets 37, or they may be bolted to the jackets.

The two variable capacitors 29 and 40 have a common set of movable plates 45 of butterfly shape. The movable plates 45 are secured to a plurality of collars 47, 49 and 51. The collar and plate assemblies are stacked on a vertical shaft 53 which is rotatable from a motor 55. The top collar 47 has a short transverse slot 57, the next collar 49 a longer slot 59, and the bottom collar 51 a long slot 61. Each slot is engaged by a pin 63 secured to the shaft 53. The inner diameter of the collars is such as to permit the shaft 53 to rotate relative to the collars to a position such that the pin engages the end of a slot in a collar.

In constructing the movable plate assembly, the plate and collar assemblies are stacked on the shaft 53 before the pins 63 are inserted in the shaft. The pins are then inserted through the slots in holes provided in the shaft.

The slot 57 in the upper collar 47 has a length only slightly greater than the diameter of its pin 63. Accordingly, as the shaft 53 is rotated the upper movable condenser plate 43 rotates with it; the center plate rotates with it after it has rotated through a predetermined angle; and the lower plate rotates with it after it has rotated through a substantially greater angle.

Since the movable plates 43 of the capacitor 29 each have a "butterfly" shape, the variable capacitor varies in a sense dependent on the direction of rotation as the shaft 53 rotates. Initially, the variation is at predetermined rate as the upper plate alone is rotated; the rate of variation is increased substantially when both the center plate and upper plate rotate; and a further substantial increase in the rate of variation is introduced when the lower plate is rotated with the others.

The compensating and load transformers 21 and 23, the load 33, the fixed capacitor 27 and the variable capacitors 29 and 40 constitute a resonant network which determines the frequency of oscillation of the oscillator 7. The control electrode 17 of one of the discharge devices 9 is connected to its cathode 15 through a choke 65, a variable resistor 67 and the exciting coil 69 of an overload relay 71. The cathode 15 of this discharge device 9 is returned to ground through the exciting coil 73 of a second overload relay 75. The control electrode of the other discharge device 11 is connected to its cathode through another choke 77, a fixed resistor 79, the exciting coils 81 and 83 of two relays 85 and 87, respectively, and the exciting coil 89 of an overload relay 91. The latter cathode 15 is also returned to ground through the exciting coil 93 of a fourth overload relay 95. The junction between the choke 65 and the variable resistor 67 is directly connected to the junction between the choke 77 and the fixed resistor 79. Between each of the grids 17 and its associated cathode 15, the network consisting of the variable resistor 67, the exciting coils 69, 73, 93 and 89 of the overload relays 71, 75, 95 and 91, respectively, the exciting coils 83 and 81 of the relays 87 and 85, respectively, and the fixed resistor 79 is connected.

The oscillations in the generator 7 are built up by feedback through the interelectrode capacities between the anodes 13 and the grids 15 of the discharge devices 9 and 11. The oscillatory potential across the resonant network 7 at any instant is increasing at one terminal (the anode of one tube) and decreasing at the other. At this instant, the potential of the anode 13 at the former terminal is becoming more positive while the anode 13 at the other terminal is becoming more negative. The grids 17 of the corresponding electric discharge devices 9 or 11 become respectively less positive and more positive as the anodes become more positive and less positive thus further increasing and decreasing the respective positive potentials of the corresponding anodes. The oscillation is built up until the build-up action is reversed by the restoring action of the resonant network 7. When the reversal occurs, the function of the anodes and grids of the tubes 9 and 11 is interchanged. Since the variation of the anode potential is always of opposite polarity to the variation of the grid potential of the same device 9 or 11, the oscillations in the circuit are built up and sustained.

As the circuit 7 oscillates, one or the other of the control electrodes 17 is at a positive potential relative to its corresponding cathode 15. Grid current therefore flows through the corresponding discharge device. The grid current of the discharge device 9 flows through the parallel branches: one made up of the variable resistor 67 and the exciting coil 69 of the overload relay 71; the other of the fixed resistor 79, the exciting coils 81 and 83 of the relays 85 and 87 and the exciting coils 89, 93 and 73 of the other overload relays 91, 95 and 75. The grid current of the other discharge device 11 flows through corresponding branches of the same network. If the grid current in either device 9 or 11 exceeds a predetermined magnitude, one of the relays, 85, is energized, opening its normally closed contacts 97. Variable resistor 67 is then increased and it tends to suppress the excess grid current. If the grid current is still greater than the predetermined magnitude, the other relay 87 is also energized and the resistor 67 is further increased. The increase in the variable resistor 67 of the network results in a decrease in grid current. However, the grid current through the branch of the network in which the exciting coils 81 and 83 of the relays 85 and 87 are connected is not changed materially, and once either or both of the relays is actuated they remain actuated.

For the purpose of stabilization, the output of the oscillator 7 is compared with oscillations of a standard frequency derived from a crystal controlled oscillator 99. The latter is provided with a pair of resonant output circuits 101 and 103; one (101) tuned to its fundamental frequency and the other (103) tuned to a harmonic frequency. Depending on the frequency at which the power supply oscillator 7 is to operate, one or the other of the resonant networks is connected to the compensating circuit through a selector switch 105.

The selected output of the crystal oscillator 99 is connected through a capacitor 107 to one of the grids 109 of a mixer tube 111 and through a resistor 113 to the corresponding grid 115 of a second mixer tube 117. The capacitor 107 and the resistor 113 are so related that there is a phase displacement of 90° between the control potentials impressed on the grids 109 and 115, respectively.

A sample of the output of the supply oscillator 7 derived from the compensating transformer 23 is impressed on other corresponding grids 119 and 121 of the mixer tubes 111 and 117, respectively, through a coupling condenser 123. In one of the mixer tubes 111, the sample output of the supply oscillator 7 is combined with the output of the standard oscillator 99; in the other mixer tube, the sample output is combined with the output of the standard oscillator displaced in phase by 90° with reference to the standard output which was put into the first mixer tube.

From the output of the mixer tubes, oscillations having a frequency equal to the difference between the combined frequencies are derived. Between the oscillations derived from one mixer tube and those derived from the other, there exists a phase displacement of 90° of the standard frequency, which would be a very small phase displacement at the difference-frequency. The output of each mixer tube 109 and 117 is impressed in the control circuit of a separate amplifier tube 125 and 127, respectively, through a coupling condenser 129 and 131, respectively.

The output of one of these amplifiers 125 is impressed in the control circuit of a tube 133 connected in a phase splitter circuit through a coupling capacitor 135. Between the cathode 137 of the phase splitter tube 133 and ground, a pair of resistors 139 and 141 are connected in series. The anode 143 of the phase splitter tube 133 is connected to one of the anodes 145 of a double diode 147 through a capacitor 149. The junction between the series resistors 139 and 141 is connected to the other anode 151 of the diode 147 through another capacitor 153 of the same magnitude as the capacitor 149. Between the anodes 145 and 151 of the diode, a pair of resistors 155 and 157 of equal magnitude are connected. Between the cathodes 159 and 161 of the diode 147, another pair of resistors 163 and 165 of equal magnitude are connected. The junction between the resistors 155 and 157, and the junction between the resistors 163 and 165, are connected, as shown at 167.

The potentials produced at the anode 143 of the phase splitter tube 133, as the oscillatory output of the amplifier 125 is impressed in its control circuit, is in opposite phase to the corresponding potentials impressed at the junction between the resistors 139 and 141 in its cathode circuit. The potentials impressed between the anodes 145 and 151 of the diode 149 are thus in opposite phase.

The output of the second amplifier 127 is coupled to the conductor 167 interconnecting the junctions between the resistors 155 and 157, and 163 and 165, respectively, between the anodes 145 and 151 and the cathodes 159 and 161 of the diode 147. This output is in quadrature with the opposite phase potentials derived from the phase splitter.

Through the phase splitter 133 and the second amplifier 127 the resultant of three vector potentials is impressed between the anodes and the cathodes of the diode; that is, across the resistors 163 and 165 interconnecting the cathodes of the diode. When the difference between the standard frequency and the sample frequency is within prescribed limits, the opposite phase potentials and the potential derived from the second amplifier 125 are in precise phase quadrature, and the potential drop across the resistors connected between the cathodes of the diode is substantially zero. The capacitors 149 and 153, the resistors 155 and 157, and the impedances of the diode are so related that when the frequency difference between the sample oscillations and the standard oscillations varies from the prescribed magnitude, the opposite-phase potentials shift in phase with reference to the potential output of the second amplifier 127. The output of one or the other of the diode halves then predominates and a potential of one polarity or the other is impressed between the resistors 163 and 165 interconnecting the cathodes 159 and 161 of the diode.

We have found that for supply oscillator frequencies of the order of 10 or 20 megacycles, the diode 147 may be a 6H6 tube, the capacitors interposed between the phase splitter and the anodes of the diode may have a magnitude of the order or 500 micromicrofarads and each of the resistors interconnecting the anodes of the diode may have a magnitude of 100,000 ohms.

The cathodes 159 and 161 of the diode are each connected directly to the control electrode 169 and 171, respectively, of a separate amplifier 173 and 175, respectively. The anodes 177 and 179 of these amplifiers are connected to a source of potential 181 (shown symbolically as a battery) through one of the two exciting coils 183 and 185, respectively, of a polarized relay 187. When the potential between the resistors 163 and 165 interconnecting the cathodes 159 and 161 of the diode 147 has one polarity or the other, one or the other of the amplifiers 173 or 175 becomes conductive and the corresponding coil 183 or 185 of the polarized relay 187 is energized. This relay is actuated to close one or the other of its circuits to energize the motor 55 to rotate the movable plates 41 of the variable condenser 29, 40 in one direction or the other.

To initiate operation of the power oscillator a starting switch 189 is closed. The switch closes a circuit extending from a power source 191 (shown symbolically as a battery) through the exciting coil 193 of a starting relay 195, a conductor 197, the normally closed contacts 199, 201, 203 and 205 of the overload relays 91, 95, 75 and 71, respectively, in the control and cathode circuits of the oscillator discharge devices 9 and 11, a conductor 207 to the switch.

The starting relay 195 is actuated opening its lower contacts 209 and closing its upper contacts 211. Power is supplied through the latter contacts 211 from a source 213 (shown symbolically as a battery) to the oscillator 7 and the latter is energized and produces oscillations in the load transformer 21 and the compensating transformer 23. The frequency of these oscillations may initially be beyond the range of control of the compensating circuit. Under such circumstances compensation would not be effected by the circuit. For this reason, a frequency responsive circuit is provided to bring the frequency of the main oscillator 7 within the range of compensation promptly after the supply potential (213) is impressed.

This circuit comprises an electric discharge device 215 between the control electrode 217 and the cathode 219 of which a resonant network 221 is connected through a negative bias 223. The network 221 is tuned to the center frequency of the band within which it is desired that the oscillator 7 operate. The output of the compensating transformer 23 is coupled to the network 221. In the anode circuit of the discharge device 215 the exciting coil 225 of a relay 227 is connected.

If the frequency of the oscillator 7 lies outside of the compensating range, the potential impressed in the resonant network 221 is relatively small, the discharge device is non-conductive and the relay 227 is deenergized. The mixers 111 and 117 are also unaffected by the sample output from the supply oscillator 7 and the polarized relay 187 is deenergized. The movable contactor 229 of the latter relay is disengaged from its fixed contacts.

The motor 55 is provided with a limit switch 231 having a movable contact 233 and fixed contacts 235 and 237. The switch remains closed in one or the other of its positions when the movable plates 45 of the variable capacitor 29 are in an intermediate angular position. When the plates 45 reach a limiting position, the movable contact 233 is actuated by a cam 238 to disengage one fixed contact 235 (say) and to engage the other 237. In the drawings, the limit switch 231 is illustrated as of the cam type. However in lieu of a cam switch, a toggle switch may be provided.

With the limit switch 231 in the position shown in the drawings, the starting relay 195 is actuated and the frequency of the oscillator beyond the operable limits of the compensating circuit (the relay 227 in the correcting circuit in the position shown), current flows from one terminal of the power source 181 through a resistor 239, a conductor 241, the fixed and movable contacts 235 and 233 of the limit switch, a conductor 243, the normally closed contacts 245 of the relay 227, intermediate contacts 247 of the starting relay closed by actuation of the starting switch, the exciting coil 249 of one of a pair of relays 251 and 253, controlling the direction of rotation of the motor 55, to ground. The relay 251 is energized opening its lower closed contacts 255 and closing its upper contacts 257. At the same time the exciting coil 259 of the other relay 253 controlling the direction of rotation of the motor 55 is short circuited by the limit switch 231 and remains deenergized.

Current now flows from one terminal of a power source 261 through the normally closed contacts 263 of the deenergized controlling relay 253, a conductor 265, the rotor of the motor 55, a resistor 267, the closed contacts 257 of the energized controlling relay 251, to the other terminal of the source 261. The motor 55 rotates in one direction varying the frequency of the oscillator 7 in one sense and, if the variation is in the proper sense, the oscillator 7 is locked in with the compensating system.

The variation of the oscillator frequency, however, may not be in the proper sense to bring the frequency of the power oscillator 7 within the range of compensation. Under such circumstances the correcting relay 227 remains deenergized and the motor 55 continues to rotate until the limit switch 231 is actuated to its opposite position. The exciting coil 249 of the direction controlling relay 251 which is at this time energized now becomes deenergized, and the exciting coil 259 of the other controlling relay is energized in a circuit extending from the power source 181 through the resistor 239, a conductor 269, the exciting coil 259 of the controlling relay 253, the intermediate closed contacts 247 of the starting relay 195, a conductor 271, the normally closed contacts 245 of the correcting relay 227, the conductor 243, the contacts 233 and 235 of the limit switch to ground. The motor 55 is now rotated in the opposite direction. The capacity of the tuning condenser 29 is varied over its entire range and during a portion of the rotation of the motor the supply oscillator 7 oscillates within the range of compensation. During this portion of the rotation, a potential of substantial magnitude is impressed across the resonant network 221 in the control circuit and of the correcting discharge device 215. The correcting relay 227 is now actuated, its lower closed contacts 245 open and its upper contacts 273 close.

The exciting coils 249 and 259 of the controlling relays 251 and 253 are now disconnected from the limit switch 231 and connected to the movable contact 229 of the polarized relay 187. As the polarized relay contacts close on one side or the other, the motor 55 rotates in one direction or the other. For example, if the contacts on the left are closed, the exciting coil 259 of one of the control relays 253 is short circuited while current is supplied to the exciting coil 49 of the other. The current flows in a circuit extending from the source 181 through resistor 239, a conductor 275, the closed contacts 229 and 277 of a polarized relay 187, a conductor 279, the upper closed contacts 273 of the correcting relay 227, the conductor 271, the intermediate closed contacts 247 of the starting relay 195, the exciting coil 249 of the controlling relay 251 to ground. The controlling relay 251 is now actuated, while the relay 253 with its coil 259 short circuited remains deenergized, and the motor rotates in such a direction as to correct any variation in frequency of the power oscillator 7.

The system shown in Figs. 1 to 4 is provided with a circuit, which to a certain extent prevents the motor from overcompensating when the initial compensation is in one sense. This circuit comprises an electric discharge device 281, preferably of the gaseous type. The anode 283 of the discharge device 281 is connected to one terminal of the rotor of the motor 55 through an alternating current supply source 285 and a rheostat 287. The cathode 289 is connected to the opposite terminal of the rotor. The control potential of the discharge device is dependent on the position of one of the direction controlling relays 251. With the controlling relay 251 deenergized, a negative control potential is impressed on the discharge device 28 and it is nonconductive.

When during the course of operation the controlling relay 251 is energized, its lower auxiliary contacts 291 open and its upper auxiliary contacts 293 close. A charging circuit for a condenser 295 in the control circuit of the discharge device is closed through the latter contacts 293. However, the closing of the condenser charging circuit does not materially affect the control potential of the discharge device 281 and the latter remains deenergized. The motor 55 rotates in a sense determined by the relay 251 and the resonant frequency of the supply oscillator is varied. When the tuning capacitor 29 becomes set so that the frequency of the oscillator 7 is within the required band, the contacts 229 and 277 of the polarized relay 187 through which the controlling relay 251 is energized open and the controlling relay is deenergized. The auxiliary contacts 293 through which the condenser 295 is charged now open and the lower auxiliary contacts 291 reclose. The condenser 295 is now discharged through a resistor 297 connected in the control circuit of the discharge device 285. The polarity of the current flow through the resistor 297 is such as to render the discharge device conductive. The latter substantially short-circuits the rotor and tends to stop the motor 55 before it overcompensates.

We have found that the anti-hunting circuit including discharge device 285 does not, if included in prior art systems, entirely suppress overcompensation. The difficulty arises from the fact that the inertia of the tuning capacitor in such systems is so large as to maintain the rotation of the motor. The overcompensation is, however, effectively suppressed in a system in accordance with our invention.

For an understanding of the operation of our system, we may assume that the movable plate assembly of the tuning capacitor 29 is in a position such that the pins 63 on the shaft 53 engage the sides of the three slots 57, 59 and 61. We may also assume that when the polarized relay 187 is closed the direction of rotation of the shaft 53 is such that all three plates 45 rotate simultaneously. The plates 45 will continue to rotate until the frequency of the supply oscillator 7 is within the required band. By reason of their inertia, they will then continue to rotate so that the frequency of the oscillator 7 eventually falls outside of the band in a sense opposite the original sense. The other contacts of the polarized relay 187 will now close and the rotation of the movable plates 45 of the capacitor 29 will be reversed. However, only the upper plate 45 of the capacitor will now rotate. The inertia of this plate being substantially smaller than the inertia of the three plates 45, the tendency to overcompensate will be materially reduced and the power oscillator will be maintained within the desired frequency band. The foregoing description of the compensating effect covers only one mode of operation of the system. Other modes of operation within the scope of our invention will be apparent to one skilled in the art.

In the customary practice of our invention, a series of charges are repeatedly heated by the power oscillator. For example, a series of dielectric discs may be successively passed through heating condenser plates during the course of a manufacturing process. Alternatively a series of pins or gears may be passed through a heating coil successively for heat treatment. As the successive items move in and out of the heating compartment, the starting switch 189 is turned on and off. During the time interval during which the charge is subjected to the electromagnetic field within the heating compartment, its properties vary materially. The reactance of the charge and the frequency of the power oscillator therefore vary materially. The frequency correction is affected by varying the tuning capacitor 29. Since the reactance of the load 33 is different at the end of the heating operation than at the beginning of a heating operation, the magnitude of the capacity 29 is different at the end of a heating operation than at the beginning of an operation. It is desirable that for each new heating operation, the oscillator be so set that its frequency is immediately substantially within the required range at the beginning of the operation.

To accomplish this objective, the tuning capacitor is reset following the end of each heating operation by operation of a Wheatstone bridge 298. The bridge comprises fixed resistors 299 and 301, a rheostat 303 and a resistor 305 which varies with the rotation of the motor 55 connected in the usual series network. A power source 307 is connected across two of the terminals of the network and a polarized relay 309 across the other terminals.

Initially several trial operations are conducted and the rheostat 303 is set so that the relay 309 is balanced at the desired value. At the beginning of each operation the starting relay 195 is energized, and, because its lower contacts 209 are opened, the polarized relay in the balanced network is disconnected from the direction controlling relays 251 and 253. As the movable plates 45 of the capacitor 29 are rotated to compensate for changes in the charge 33, the variable resistor 305 in the balanced network 298 is changed. At the end of the heating operation, the starting relay 191 is deenergized and the controlling relays 251 and 253 are connected to the polarized relay 309 in the balanced network 298. The variable resistor 305 now being displaced from its original position, the balanced network 289 is unbalanced and the polarized relay 309 is actuated so that one or the other of its sets of contactors closes. One or the other of the controlling relays 251 or 253 is now energized causing the motor 55 to rotate in one direction or the other until the bridge 298 is balanced. At the same time, the tuning capacitor 29 is returned to its initial magnitude. For example, if the contacts 311 and 313 on the left of the polarized relay 309 are closed, current is supplied from the power source 181 through the closed contacts 311 and 313, a conductor 315, the now reclosed lower contacts 209 of the starting relay 191, the exciting coil 249 of the controlling relay 251 to ground. The other controlling relay 253 is actuated in a corresponding manner.

Figure 5:
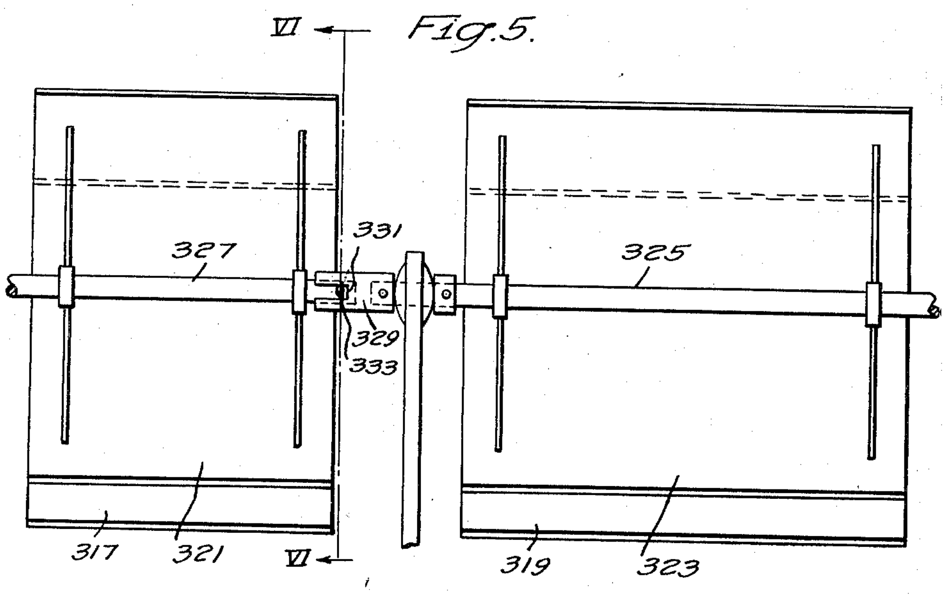
Fig. 5 is a view in elevation illustrating a modification of our invention.
Figure 6:
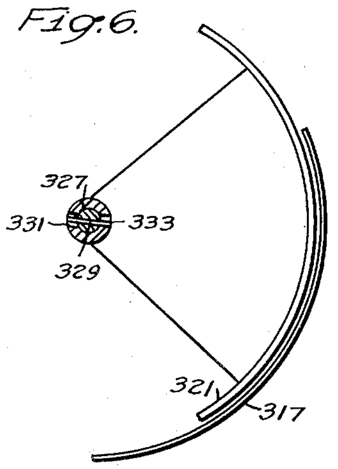
Fig. 6 is a view in section taken along the line VI—VI of Fig. 5.

In Figs. 5 and 6, a modified tuning capacitor in accordance with our invention is shown. The latter comprises a pair of fixed plates 317 and 319 in the form of arcs of a cylinder with which a pair of movable plates 321 and 323 of similar form cooperate to produce a variable capacity. Each fixed plate 317 and 319 may be welded or brazed to the outer wall of a jacket of a discharge device (not shown) in an oscillator circuit. One of the movable plates 323 is mounted to rotate with a shaft 325 which may be rotated from the motor (not shown) through a system of gears. The other movable plate is mounted on another shaft 327. This shaft 327 is inserted in a collar 329 secured to the first mentioned shaft 325 so that it (the collar) rotates with the latter. The collar is provided with a slot 331 of substantial width which is engaged by a pin 333 mounted on the shaft 327 inserted in its end. When the motor is energized, it initially rotates the movable plate 323 to vary the capacitor at a predetermined rate. After the shaft 327 has rotated through a predetermined angle, the pin 333 is engaged by the walls of the slot 331 in the rotating collar 329 and the other movable plate 321 is rotated so that the capacitor is varied at a substantially greater rate.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. An oscillator comprising a valve and a resonant network for determining the frequency of oscillation of said oscillator, said resonant network including a reactance, and a moving mechanism responsive to the frequency of said oscillator for varying said reactance, the movement of said mechanism in one sense varying said reactance in one sense at a rate which is a function of the extent of movement until said movement reaches a predetermined extent and movement of said mechanism beyond said extent varying said reactances at a substantially higher rate as a function of movement.

2. In combination, a resonant oscillatory network including a reactance, and a moving mechanism responsive to the frequency of said network for varying said reactance to vary the resonant frequency of said network, said reactance being composed of a plurality of sections relatively movable by said mechanism so that the movement of said mechanism in one sense varies said reactance at a predetermined rate as a function of the extent of movement until said movement reaches a predetermined extent and movement of said mechanism beyond said extent varying said reactance at a substantially higher rate as a function of movement of said mechanism.

3. In combination, a resonant oscillatory network including a condenser and a moving mechanism responsive to the frequency of said network for varying said condenser to vary the resonant frequency of said network, said condenser having fixed plates and plates movable relative to said fixed plates by said mechanism, certain of said movable plates being the only plates movable by said mechanism until the movement of said mechanism reaches a predetermined extent, and as the movement of said mechanism extends beyond said extent certain other of said plates being movable by said mechanism.

4. An oscillator, including a valve and a resonant network for determining the frequency of oscillation of said oscillator, said network including a reactance, said reactance being composed of a plurality of relatively movable sections, and a moving mechanism responsive to the frequency of said oscillator for moving certain of said sections relative to the others so that the movement of said mechanism in one sense varies said reactance at a predetermined rate until said movement reaches a predetermined extent and movement of said mechanism beyond said extent varying said reactance at a substantially higher rate as a function of movement of said mechanism.

5. In combination, a resonant oscillatory network including a condenser and a moving mechanism responsive to the frequency of said network for varying said condenser to vary the resonant frequency of said network, said condenser having fixed plates and plates movable relative to said fixed plates by said mechanism, certain of said movable plates being the only plates movable by said mechanism until the movement of said mechanism reaches a predetermined extent, and as the movement of said mechanism extends beyond said extent certain others of said plates being movable by said mechanism, together with said first-named movable plates.

6. An oscillator comprising a valve and a resonant network for determining the frequency of oscillation of said oscillator, said network including a condenser having fixed plates and plates movable relative to said fixed plates, certain of said movable plates being movable relative to others of said movable plates, and a mechanism responsive to the frequency of said oscillator for moving said movable plates, coupling means connecting said mechanism to said movable plates to move certain of said movable plates only in one sense until the movement in said sense reaches a predetermined extent and to move certain others of said movable plates in said one sense beyond said predetermined extent.

7. An oscillator comprising a valve and a resonant network for determining the frequency of oscillation of said oscillator, said network including a condenser having fixed plates and plates movable relative to said fixed plates, certain of said movable plates being movable relative to others of said movable plates, and a mechanism responsive to the frequency of said oscillator for moving said movable plates, coupling means connecting said mechanism to said movable plates to move certain of said movable plates only in one sense until the movement in said sense reaches a predetermined extent and to move certain others of said movable plates together with said first-named movable plates in said one sense beyond said predetermined extent.

8. A frequency stabilizing system comprising a resonant network, a variable reactance for varying the resonant frequency of said network, said reactance being variable in sections, variation of certain of said sections producing variations in the frequency of said network to a greater extent than variations of other of said sections, a moving mechanism for varying said reactance, movement of said mechanism in one sense varying said first-named sections to vary said frequency at a predetermined rate as a function of extent of movement until said movement reaches a predetermined extent and movement of said mechanism beyond said extent varying said other sections to vary said frequency at a substantially greater rate as a function of extent of movement and a controller for said mechanism, responsive to the resonant frequency of said network when it varies from a predetermined frequency range, to cause said mechanism to move to correct for the variation.

9. A frequency stabilizer comprising a frequency determining network and a controller responsive to the resonant frequency of said network when it varies from a predetermined range of frequencies to return said network to a resonant frequency within said range, said controller operating to vary the frequency of said network from its initial value in a predetermined sense by predetermined increments until the variation from the initial value reaches a predetermined magnitude and to vary said frequency in said sense by substantially greater increments when the variation from said initial value exceeds said magnitude.

10. A frequency stabilizer comprising a frequency determining network and a controller responsive to the resonant frequency of said network when it varies from a predetermined range of frequencies to return said network to a resonant frequency within said range, said controller operating to vary the frequency of said network from its initial value in a predetermined sense by predetermined increments until the variation from the initial value reaches a predetermined magnitude exceeding the magnitude required to return said network to said resonant frequency and to vary said frequency in the opposite sense by increments substantially smaller than said predetermined increments to return the frequency of said network to said predetermined range.

11. A frequency stabilizing system comprising a resonant network including a reactance having fixed plates and movable plates, certain of said movable plates being movable relative to certain others of said movable plates, a controller, responsive to the frequency of said network when said frequency is at a magnitude outside of a predetermined range of frequencies, operating to move only said first-named movable plates in one sense such as to return the frequency to said range until the frequency of said network varies from said magnitude by a predetermined quantity and to move said other plates in addition to said first-named movable plates in said one sense when said quantity is exceeded.

12. A frequency stabilizing system comprising a resonant network including a reactance having fixed plates and movable plates, certain of said movable plates being movable relative to certain others of said movable plates, a controller, responsive to the frequency of said network when said frequency is of a magnitude outside of a predetermined range of frequencies, operating to move said first-named and said other movable plates in one sense such as to return the frequency to said range until the frequency of said network varies from said magnitude by a predetermined quantity exceeding the quantity which would have returned said frequency to said range and to move only said first-named movable plates in the opposite sense to return the frequency of said network to said range.

13. An oscillator comprising a pair of tubes each having an anode and a resonant network for determining the frequency of oscillation of said oscillator, said resonant network including a reactance, said reactance comprising fixed plates physically attached to the anodes of said tubes, movable plates intermeshed with said fixed plates, said movable plates being carried on a shaft in such manner that as said shaft is rotated said movable plates are progressively moved a predetermined extent, a moving mechanism responsive to the frequency of said network and attached to said shaft for moving said movable plates to tune said resonant network.

SHELDON I. RAMBO.
RUPERT L. RUMPF, JR.

REFERENCES CITED

The following references are of record in the file of this patent:

UNITED STATES PATENTS

| Number | Name | Date |
|---|---|---|
| 1,550,016 | Dodge | Aug. 18, 1925 |
| 1,554,713 | Clinker | Sept. 22, 1925 |
| 1,621,721 | Hayden | Mar. 22, 1927 |
| 1,768,703 | Marvel | July 1, 1930 |
| 1,911,253 | Washington | May 30, 1933 |
| 1,936,671 | Hurt | Nov. 28, 1933 |
| 1,942,792 | Appel, Jr. | Jan. 9, 1934 |
| 2,002,353 | Reinken | May 21, 1935 |
| 2,044,749 | Usselman | June 16, 1936 |
| 2,115,619 | Carpenter | Apr. 26, 1938 |
| 2,205,190 | Farrington | June 18, 1940 |

FOREIGN PATENTS

| Number | Country | Date |
|---|---|---|
| 255,517 | Great Britain | July 20, 1926 |